United States Patent [19]

Miyake et al.

[11] 3,709,568
[45] Jan. 9, 1973

[54] HYDRAULIC BRAKE PRESSURE CONTROL SYSTEM AND METHOD FOR VEHICLES

[75] Inventors: Hirotaka Miyake; Shinji Kawai, both of Kariya, Japan

[73] Assignee: Aisin Seiki Kabushiki Kaisha, Kariya-shi, Japan

[22] Filed: May 8, 1970

[21] Appl. No.: 35,632

[30] Foreign Application Priority Data

May 11, 1969 Japan.............................44/35701
May 11, 1969 Japan.............................44/42737

[52] U.S. Cl. ............................. 303/22 R, 188/195
[51] Int. Cl. ............................................. B60t 8/20
[58] Field of Search ...... 188/195, 349; 303/6 C, 22 R

[56] References Cited

UNITED STATES PATENTS

| 3,442,557 | 5/1969 | Oberthur | 188/195 X |
| 3,506,313 | 4/1970 | Lawson | 188/195 X |
| 3,576,350 | 4/1971 | Larsen | 303/22 R |
| 3,199,928 | 8/1965 | Chovings | 303/22 R |
| 3,379,479 | 4/1968 | Lepelletier | 303/22 R |

FOREIGN PATENTS OR APPLICATIONS

| 1,906,461 | 2/1970 | Germany | 303/22 R |
| 2,000,053 | 7/1970 | Germany | 188/195 |

*Primary Examiner*—Milton Buchler
*Assistant Examiner*—Stephen G. Kunin
*Attorney*—Berman, Davidson and Berman

[57] ABSTRACT

In a hydraulic brake pressure control system for vehicles having a brake regulator comprising a cylinder, a differential piston provided with small and large effective surfaces and engaged in the cylinder, which subdivides the cylinder inside into two chambers, a control valve to open or shut off intercommunication between the two chambers by means of hydraulic pressure differences produced by the differential piston, a valve spring biasing the piston to hold the control valve normally open, predetermining the piston operation start, and also a wheel load sensing apparatus to vary the effect of the valve spring in response to changes of the distance between the two masses separated by the vehicle suspension system, improvements, wherein, are to make the wheel load sensing apparatus have little effect toward the piston in the intermediate point of the largest relative changing amount between the two masses, the valve starting its operation only by the predetermined load of the valve spring and also to increase and decrease the biasing force of the valve spring onto the piston with a switchover point of said intermediate one.

11 Claims, 8 Drawing Figures

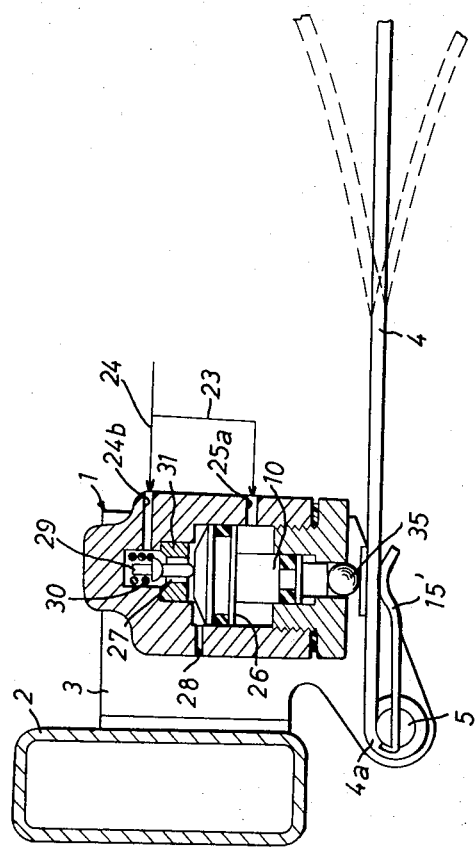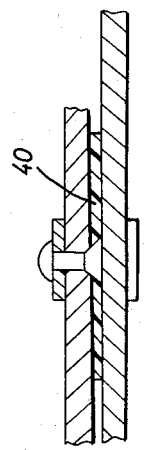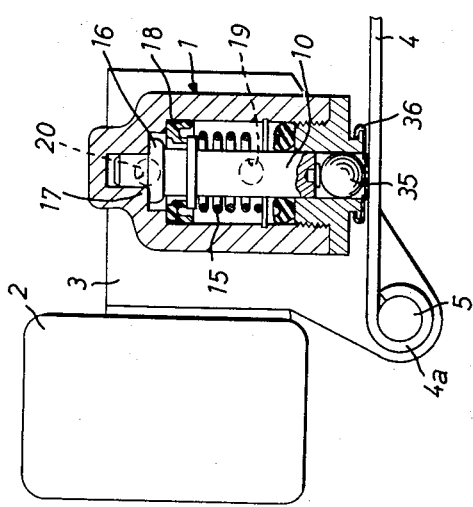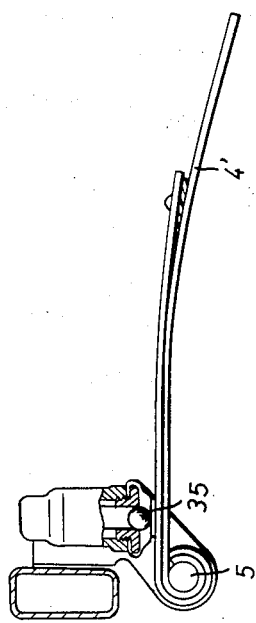

HYDRAULIC BRAKE PRESSURE CONTROL SYSTEM AND METHOD FOR VEHICLES

This invention relates to a system to control hydraulic brake pressure for vehicles, interposed between the master cylinder and at least the rear wheel brake cylinders. More particularly this invention relates to a novel controlling system and method to be adopted to a brake regulator to vary the braking force on vehicle wheels depending upon the wheel load. The brake regulator is controlled by the changes of the wheel load caused by the car load or vehicle weight and the braking operation, which are sensed as the distance differences between two masses separated from each other by the vehicle suspension system.

Well known already is a brake regulator comprising a cylinder, a differential piston provided with small and large effective surfaces, engaged in the cylinder, a control valve to open and close intercommunication between two cylinder chambers formed by the differential piston and respectively connected to the master cylinder and the brake cylinders, being operable by the piston moved by the hydraulic pressure differences produced from the differences of the effective surfaces of the differential piston and a valve spring biasing the piston to have the valve normally open, predetermining the piston operation start by the set value of the pressure transmitted from the master cylinder.

Such devices are also well known under the names of a load-sensing-valve or a load responsive hydraulic braking pressure proportioning system as to vary the braking force on vehicle wheels depending on the variable wheel load by changing the effect of the said valve spring of the brake regulator in response to the distance differences between the two masses which the vehicle suspension system separates from each other. Heretofore the control of the said brake regulator is realized by a wheel load sensing spring to directly operate on the differential piston, another wheel load sensing spring to be installed to give the valve spring an additional load to a predetermined one by a resilient member, another wheel load sensing spring to decrease the load previously given to the valve spring, etc.

In the control system heretofore in use as mentioned above, however, when the wheel load sensing device goes out of order or is damaged, no normal braking wheel operation can be realized by excessive or insufficient supply of brake apply pressure as shown in FIG. 6 and FIG. 7.

As for the wheel load sensing system to transmit to the brake regulator the changes of the distance caused by the suspension system in its works between the body portion and the wheel axle, provided so far are a coil spring one end of which is secured to the wheel axle, while its other end fixed directly on the brake regulator installed on the body portion, a combination of a lever and a coil spring being installed between the wheel axis and the regulator on the body, modulating pressure of a height modulator, and so on. These types of the wheel load sensing systems are necessarily to be made in large sizes with complicated constructions suffering much friction losses in order to sense and transmit to the brake regulator the minimum and the maximum distance changes between two masses separated from each other by the suspension system of the vehicle. The minimum distance is described as a case when the wheel axle is positioned to touch the cushion rubber on the body, meanwhile, the maximum distance is explained as a case when the wheel axle hangs freely down, the body lifted up with the fulcrum of the frame.

The most important object of this invention is, therefore, to provide a hydraulic brake pressure control system for vehicles and its controlling method having a brake regulator interposed between the master cylinder and braking circuits to control the hydraulic brake pressure. The valve spring of the brake regulator is designed to start its operation with the predetermined load when the distance between the wheel axle and the body corresponds to its midlength between the lengths of the loaded and unloaded states of the vehicle. And the said midway distance is the switchover point for the changing amount transmission of the wheel load to increase and decrease its load onto the valve spring. Consequently, the breakage of the wheel load sensing system does not hazard the entire braking facility since even in such a case the control of hydraulic brake pressure can be carried out sufficiently by the valve spring alone.

Another important object of this invention is to provide a hydraulic brake pressure control system adopting a leaf spring or a torque bar as the wheel load sensing device to transmit to the brake regulator the distance differences between the wheel axle and the bodyportion of the vehicle. This specified sensing spring is rotatably engaged at one end thereof on the brake regulator bracket secured on the body or the wheel axle. The other end of this sensing spring is also engaged rotatably on the wheel axle or the body, the whole member, thus, having the effect as a lever with its fulcrum at a place adjacent the secured end thereof on said bracket. It is apparent that these new facilities can simplify the construction of the device.

Another object of this invention is to provide a wheel load sensing means having leaf spring or a torque bar for said wheel load sensing device. This specified sensing spring is formed to make the both ends thereof eye members, one of which is rotatably engaged on a shaft embossed on the brake regulator bracket secured on the body or the wheel axle. The other eye member is also engaged rotatably on an arm installed on the wheel axle or the body. This specified sensing spring, thus, has the lever effect with the fulcrum at a place adjacent the secured end thereof on said bracket. These new arrangements simplify the construction of the device and the whole device can easily be installed with the help of the lever effect of the specified sensing spring.

Still another object of this invention is to provide a wheel load sensing means as mentioned above, wherein, the operation losses caused by friction resistance in said means can be minimized as well as the designing of the device can be done with great ease by means of an elastic bush of rubber or rubber like materials. Said bush is to be adopted at the engaging points of said specified sensing spring on said arm and the brake regulator bracket, absorbing the twisting torque of the sensing spring by the titubation of the arm.

Another object of this invention is to provide a wheel load sensing means as mentioned so far, wherein, the predetermined load to the valve spring of the brake regulator can easily be adjusted to desired amounts by adopting adjustable bolts and nuts which change the length of said arm with no complicated process. The changes of the arm length adjust in turn the biasing force of the specified sensing spring toward the brake regulator.

A still further object of this invention is to provide a wheel load sensing means as disclosed so far, wherein, the size of the means can be minimized and the accuracy of the load sensing operation to the brake regulator is greatly increased by adopting a leaf spring with one edge thereof doubled for said sensing spring. As necessary, a cushion of rubber or equally elastic materials can be placed between the leaves of the spring. The double leaf spring can shorten the necessary length thereof, the cushion decreasing the vibration of the sensing spring.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention, wherein:

FIGS. 2, 3 and 4 are part sectional elevational views, showing three modified embodiments;

FIG. 5 is a sectional view of a part of FIG. 4;

Corresponding parts are provided throughout the figures with similar reference numerals.

Figure 1:
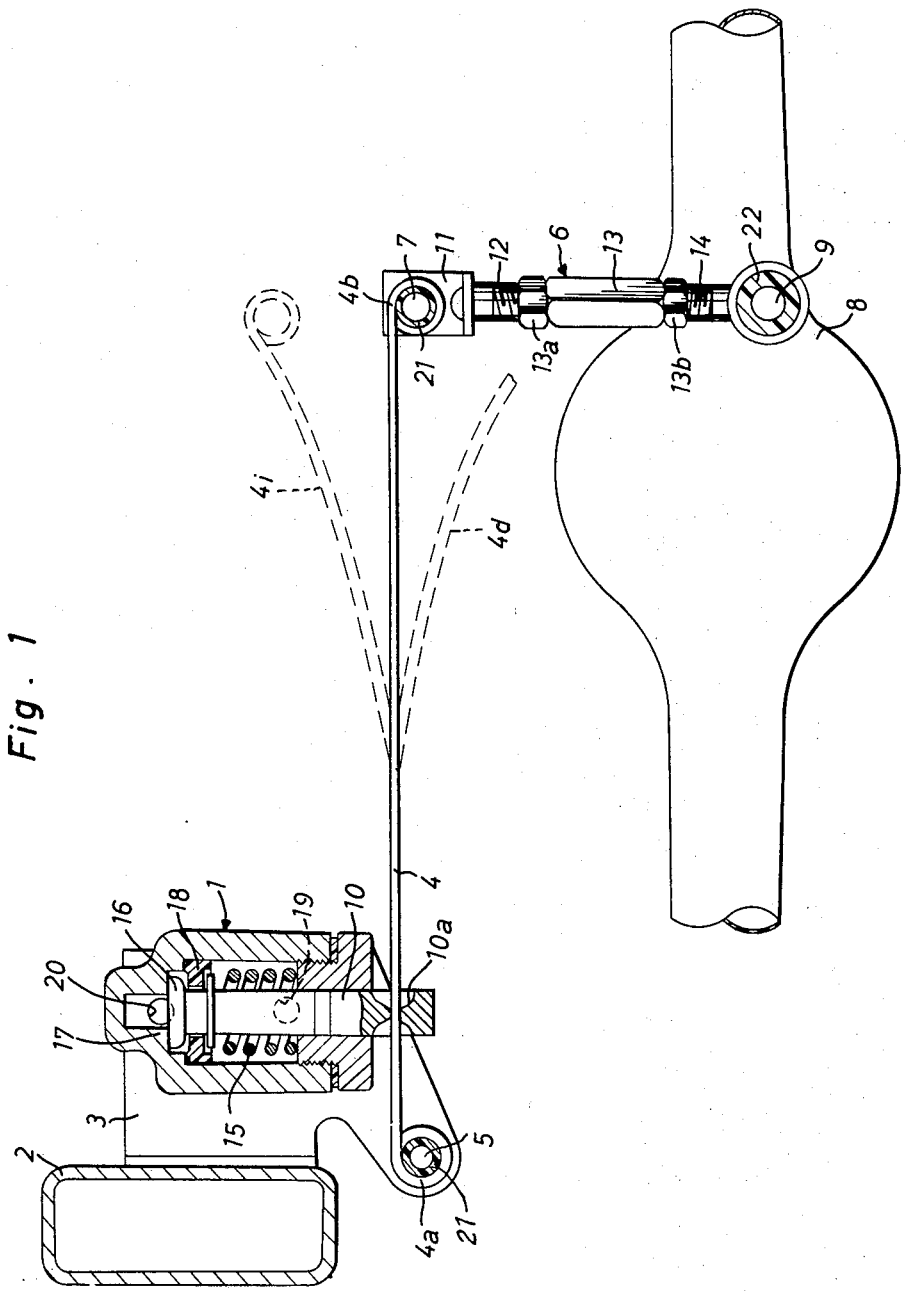
FIG. 1 is a part sectional elevational view of a device in accordance with this invention, arranged adjacent the rear axle of a vehicle.

In FIG. 1, a brake regulator 1 is secured on a bracket 3 welded to the vehicle body frame 2. A wheel load sensing spring 4 is either a leaf spring or a torque bar, on both ends of which eye members 4a and 4b are respectively formed. The eye member 4a is journaled on a shaft 5 embossed on the lower portion of the bracket 3, the other eye member 4b is engaged to a shaft 7 embossed on the upper edge of an arm 6 through a rubber bush 21. The arm 6 comprises an adjusting bolt 12 secured on the lower portion of a bracket 11, a revolving bolt 14 rotatably engaged to a shaft 9 embossed on a differential gear case 8 through a rubber bush 22 and an adjusting nut 13 to connect the adjusting bolt 12 to the revolving bolt 14, threaded in the adjusting bolt 12 at the top end and in the revolving bolt 14 at the lower end. The length of the arm 6 varies by turning the adjusting nut 13, which adjusts in turn the predetermined load of the spring 4. Nut 13a is to keep the nut 13 and the bolt 12 in position, a nut 13b preventing the nut 13 and the bolt 14 from getting loose.

The spring 4 is, as shown in FIG. 1, engaged in a hole 10a made at the outer edge of a piston 10, held therein by two round-headed bosses spaced vertically apart. This construction creates very smooth transmission of loads between the piston 10 and the spring 4 as well as letting the spring 4 have lever effect toward the piston 10 with its fulcrum at the shaft 5, when the spring 4 makes vertical movements with its fulcrum at the shaft 5. Accordingly, changes of the distance between the body and the wheel axle by different car loads or transfers of the center of gravity of the vehicle in wheel braking operation results in bending the spring 4 to such free positions 4i or 4d shown with dotted lines within a set area to give different loads to the piston 10 of the brake regulator 1.

The brake regulator 1 is of the construction heretofore in use, in which the piston 10 is, in its inoperative position, normally biased upward by the difference of the spring forces of a valve spring 15 and the spring 4. Consequently, the piston 10 urges the upper face of a valve 16 onto a shoulder 17 of the cylinder. A valve seat 18 and the valve 16 are apart from each other in inoperative position, connecting one chamber in communication with the master cylinder (not shown) via an inlet 19 to another chamber in communication with brake cylinders (not shown) through an outlet 20. The hydraulic pressure from the master cylinder amounting up to a predetermined value, the pressure which acts on a piston surface of the same area as the cross sectional surface of the piston end jutting out in air exceeds the load of the difference in the biasing forces between the valve spring 15 and the spring 4. This moves the piston 10 downward, causing the valve 16 to move snugly against the valve seat 18 and closing communication between the inlet 19 and the outlet 20. Then, the piston 10 moves upward to open the valve 16 urged by upward pressure (in the drawings) on an annular area equivalent to the difference between areas of the cross sectional surface of the piston 10 and the effective sealing bore of the valve seat 18 which is larger than the cross sectional surface of the piston end jutting out in air. Through the valve 16 now open, the inlet 19 communicates with the outlet 20 and some pressure fluid moves from the chamber of the inlet 19 into the chamber of the outlet 20, increasing the hydraulic pressure in brake cylinders.

The communication of the inlet 19 with the outlet 20 makes, as described above, the piston 10 move down, and while the hydraulic pressure supplied from the master cylinder into the chamber of the inlet 19 is being increased by the brake pedal operation, the piston 10 continues its vertical flapping movement to increase continuously the hydraulic pressure toward the outlet 20 connected to the brake cylinders. In this operation, the ratio of the hydraulic pressure increase at the outlet 20 side versus that at the inlet 19 side is in proportion to the difference between said annular area and the whole area of said effective sealing. The annular area being smaller than the whole area of said sealing, the hydraulic pressure in brake cylinders increases as controlled to be lower than the hydraulic pressure supplied to the inlet 19 from the master cylinder.

The piston 10 starts its flapping movement when the hydraulic pressure comes up to the predetermined value of the valve spring 15. The hydraulic pressure value to start the piston flapping movement varies in response to the force of the valve spring 15 depending upon that of spring 4 or vice versa. Thus, varying the force of the valve spring 15 is to control the hydraulic pressure in brake cylinders. This enables the control of the brake regulator 1 in accordance with the differences of the wheel load by the changes of the biasing force of the spring 4 which modulate the hydraulic pressure value to start said piston-flapping movement for hydraulic pressure braking operation. Said changes of the spring 4 are produced when the spring 4 is bent to the position 4i or 4d by the changes of distance between the body and the wheel axle, the latter change caused by the variable car load and/or the transfer of the center of gravity of the vehicle in braking wheel operations.

In this invention, however, said spring 4 is installed so as that in its neutral position, as shown with solid lines in FIG. 1, it has little effect on the piston 10 or the valve spring 15 when the car load is in the middle value between the maximum and minimum. In FIG. 1, the spring 4 is bent to the position 4i when the distance between the body and the wheel axle is shortened, that is, when the increase of the car load or of the wheel load is increased by other causes. The hydraulic brake pressure to be given to the rear wheels is then proportionately increased. As apparent in the drawings, the spring 4 in the position 4i urges the piston 10 upward more strongly, increasing the hydraulic pressure required to start said flapping movement of the piston 10.

Contrary to the above, when the distance between the body and the wheel axle becomes larger because of the decrease of the car load and/or the wheel load, the spring 4 is bent to the position 4d to decrease the load of the valve spring 15 toward the piston 10. This reduces the hydraulic pressure to start the flapping movement of the piston 10. That is to say, as the load on the rear wheels decreases, the hydraulic braking pressure against the rear wheels is controlled to be lower.

As described above, in the device in accordance with this invention, the control of hydraulic brake pressure can be realized in response to the change of the wheel load at every moment. When the spring 4 is in the position shown with solid lines in FIG. 1, namely, in the neutral position, the braking operation lets the spring 4 have very little effect on the piston 10, the flapping movement of which then starts only through the effect of the valve spring 15. Accordingly, even in an emergency when a part or the whole of the wheel load sensing means is broken, the piston 10 is being controlled by the valve spring 15 alone. The control of the brake regulator in such a case may not be done correctly in concert with the wheel load at the moment, the normal braking operation can, however, be compensated by the valve spring 15 alone with the spring 4 in the neutral position, in other words, in the center position when the wheel load is centered between fully loaded and unloaded states. This eliminates dangerous braking operations; no excessive hydraulic braking operation is made over the wheel load sensing area as shown with solid lines in FIGS. 6 and 7.

Figure 6:
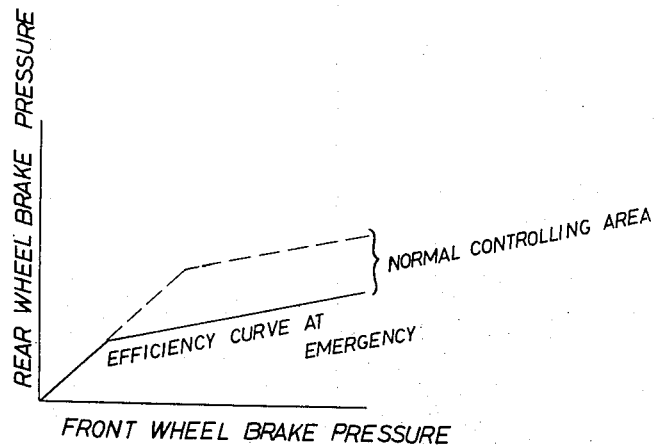
FIGS. 6 and 7 show efficiency curves of usual devices.
Figure 7:
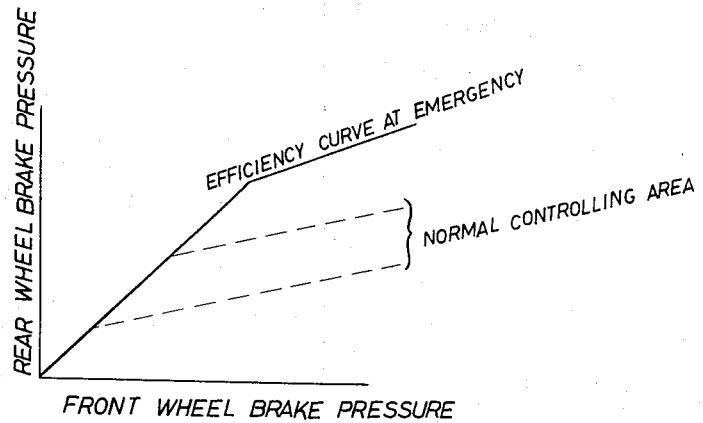
Figure 8:
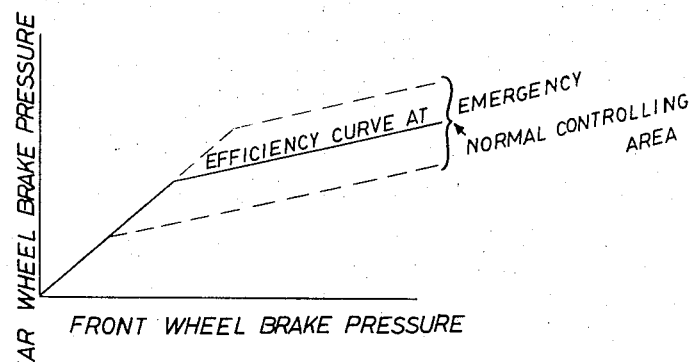
FIG. 8 shows an efficiency curve of a device in accordance with this invention.

Referring further to FIGS. 6 and 7, when the wheel load sensing means is in its normal operation, an effective curve in concert with the wheel load at every moment runs between two effeciency curves shown with dotted lines. In the device of this invention, even in the emergency as mentioned, the effeciency curve of the device never goes out of the area between two efficiency curves shown in dotted lines but an efficiency curve is obtained as shown with a solid line in FIG. 8.

In the device in accordance with this invention, the spring 4 is provided with eye members 4a and 4b directly on the both ends thereof, having thus a lever effect in addition to its spring force. This simplifies the whole construction of the device, lessening the mechanical friction resistance. The lever effect of the spring 4 enables easy engagement of the eye members 4a and 4b on said shafts 5 and 7 and the pure bending torque of the leaf spring or the torque bar renders accurate operation of the device. The twisting torque of the spring 4 caused by tittuping motion of the arm 6 can be absorbed by the rubber bushes 21 and 22 respectively adopted between the eye member 4b on one end of the spring 4 and the shaft 7 on the arm 6, the length of which is adjustable, and between the bolt 14 of the arm 6 and the shaft 9 embossed on the differential gear case 8. The neutral position of the spring 4 can easily be changed by adjusting the length of the arm 6 by the adjusting nut 13.

Even in a case that the spring 4 is broken, leaving a piece thereof engaged in the outer end of the piston 10, the biasing force of the valve spring 15 exceeds to a great extent the biasing force of the spring 4 so as not to interfere the control of the piston 10 by the biasing force of the valve spring 15.

Shown in FIG. 2 is a modified embodiment of the device in this invention, wherein, a ball 35 is placed at the outer edge of the piston 10. The ball 35 is held with an elastic cover 36 secured on the outer edge of the cylinder. This produces smooth transmission of the force between the piston 10 and the spring 4, said force being transferred through the ball 35. Another advantage in this particular construction is to realize smooth control of the piston 10 by the valve spring 15 even when the sensing means comprising the spring 4, the arm 6, etc. is broken, since the spring 4 then automatically drops off the outer edge of the piston 10.

FIG. 3 shows a further modified embodiment of the invention, wherein, the valve spring 15 in FIG. 1, is replaced by a valve spring 15' installed at the outside of the cylinder of the brake regulator 1. The root of the valve spring 15' is pressed in a groove of the shaft 5 embossed on the bracket 3 and held in position, urging the piston 10 as well as the spring 4 upward through a ball 35. Same as in the embodiment shown in FIG. 1, in the embodiment in FIG. 3, the spring 4, to sense the changes of the wheel load, is installed so as to keep its neutral position, as shown with the solid line in FIG. 3, to have little effect on the piston 10 when the wheel load is in the middle value between the maximum and minimum. Thus, the control of hydraulic braking pressure is conducted only by the valve spring 15' when the wheel load is in the middle value of the wheel load sensing area.

In FIG. 3, the construction of the brake regulator 1 is different from the brake regulator 1 shown in FIG. 1, but the aim to control the hydraulic braking pressure and the efficiency are same. Hydraulic pressure supplied from the master cylinder operates on the shoulder 26 of the piston 10 through a conduit 23 and the inlet 25a as well as on the whole surface of the head of the piston 10 on its way to the brake cylinders through a conduit 24, the inlet 24b, a passage 27 and the outlet 28. When the hydraulic pressure from the master cylinder to push down the piston 10 comes to exceed the total upward forces of the valve spring 15' and the spring 4, the piston 10 moves downward, a valve 29 moving also downward by the biasing force of a spring 30 to be urged against a valve seat 31. This closes communication of the pressure in the master cylinder with that in the brake cylinders. The further increase of the pressure in the master cylinder urges the piston 10 upward to release the valve 29 from the valve seat 31. This produces a small increase of the pressure in the brake cylinders to urge the piston 10 downward again. The retraction of the piston 10 closes the connection of the pressure in the master cylinder to that in the brake cylinders. The increasing ratio of the pressure in the brake cylinder versus that in the master cylinder is determined by the effective areas of the piston 10 to the pressure in the master cylinder and brake cylinders. As is in the case explained in the embodiment of FIG. 1, when the wheel load sensing means formed with the spring 4 is broken, the control of the piston 10 is conducted only by the valve spring 15' to eliminate extremely dangerous braking operations.

FIGS. 4 and 5 show other embodiments of the device in this invention, wherein, the spring 4 of the embodiment shown in FIG. 2 is replaced by a leaf spring 4'. The spring 4' is doubled at the side of the shaft 5 and the whole length thereof is shortened. The friction torque of the doubled leaf spring 4' decreases the vibration of the spring itself and the whole device can be designed in a smaller size. As shown in FIG. 5, a rubber like material 40 can be placed between the leaves of the spring where doubled, decreasing the vibration more efficiently and effectively.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. In a vehicle having a body frame and wheel axle support means separated from each other by a suspension system, wheel brake cylinders, a master cylinder and a pressure fluid braking circuit connecting said braking cylinders to said master cylinder, the combination of a brake regulator with wheel load sensing means connected to the regulator for controlling operation of the regulator, said regulator being secured to one of said body frame and wheel axle support means and including a cylinder, a differential piston subdividing the cylinder interior into two chambers facing piston surfaces of different areas and connected respectively to the master cylinder and the brake cylinders, valve means for controlling the intercommunication of said two chambers engaging said piston, and spring means biasing the piston in the direction to keep said valve means normally open, said wheel load sensing means including a leaf spring pivoted at one end to said body frame and at the other end to said wheel axle support means, and said leaf spring engaging said piston of the regulator through an interposed ball at a fulcrum point between the ends of the leaf spring and close to one end so as to exert a biasing force axially of said piston to regulate the biasing force of said spring means of the regulator.

2. The combination set forth in claim 1, wherein the end of said leaf spring closer to the fulcrum is pivoted on a bracket which also holds the brake regulator and the other end of the leaf spring is pivoted to one end of an arm whose other end is pivoted to one of said body frame and wheel axle support means, said arm being adjustable and including rotatable bolts and nuts threaded on both ends thereof to change the length of the arm, the changes of length of said arm enabling modulation of the force of said spring means against the regulator piston.

3. The combination as set forth in claim 2, wherein said leaf spring is provided with an eye at each end, one of said eyes being engaged on a shaft projecting from said body frame and the other eye being mounted on a shaft projecting from said wheel axle support means.

4. The combination as set forth in claim 3, wherein said one eye member is mounted on a shaft projecting from said bracket, said bracket being secured to said body frame.

5. The combination as set forth in claim 4, wherein said eye at the other end of the leaf spring is mounted on a shaft projecting from said arm which is secured to said wheel axle support means.

6. The combination as set forth in claim 3, wherein an elastic grommet is positioned between each of said eye members of the leaf spring and the mounting shaft therefor.

7. The combination as set forth in claim 1, wherein said leaf spring is bent double at one end, the friction force between the two laminations of the bent spring absorbing the vibration of the leaf spring whereby to more accurately transmit wheel load forces of the leaf spring to the regulator piston.

8. The combination as set forth in claim 7, wherein an elastic member is placed between the two laminations of the doubled leaf spring.

9. In a vehicle having a body frame and wheel axle support means separated from each other by a suspension system including spring elements, wheel brake cylinders, a master cylinder and a pressure fluid braking circuit connecting said brake cylinders to said master cylinder, the combination of a brake regulator with wheel load sensing means connected to the regulator for controlling operation of the regulator, said regulator being secured to one of said body frame and wheel axle support means and including a cylinder, a differential piston subdividing the cylinder interior into two chambers facing piston surfaces of different areas and connected respectively to the master cylinder and the brake cylinders, valve means for controlling the intercommunication of said two chambers engaging said piston, and spring means biasing the piston in the direction to keep said valve means normally open, said wheel load sensing means including a leaf spring pivoted at one end to said body frame and at the other end to said wheel axle support means through an adjustable arm, said leaf spring being separate from, additional to and independent of said spring elements of the suspension system and engaging said piston of the regulator at a fulcrum point between the ends of the leaf spring and close to one end so as to exert a biasing force axially of the piston to regulate the biasing force of said spring means of the regulator, whereby said leaf spring because of its independence of the suspension system and its pivotal support through said arm conducts force of bending action only to the regulator piston.

10. The combination set forth in claim 9, wherein said leaf spring directly engages said piston of the regulator at said fulcrum point without interposition of other elements.

11. The combination as set forth in claim 10, wherein said leaf spring passes swingably through an opening provided in the outer end of said piston which juts out from its cylinder.

* * * * *